United States Patent [19]

Jenkner

[11] 4,364,291
[45] Dec. 21, 1982

[54] FRAME FOR A RECIPROCABLE CIRCULAR SAW

[76] Inventor: Erwin Jenkner, Lindenstrasse 13, D-7261 Gechingen, Fed. Rep. of Germany

[21] Appl. No.: 263,118

[22] Filed: May 13, 1981

Related U.S. Application Data

[63] Continuation-in-part of Ser. No. 62,406, Jul. 31, 1979, abandoned.

[30] Foreign Application Priority Data

Jul. 31, 1978 [CH] Switzerland .................. 8178/78

[51] Int. Cl.³ ............................................. B23D 47/02
[52] U.S. Cl. ................................. 83/100; 83/471.2; 83/477.2; 83/488; 83/595
[58] Field of Search ................ 83/488, 487, 477.2, 83/471.2, 595, 100

[56] References Cited

U.S. PATENT DOCUMENTS

| | | | |
|---|---|---|---|
| 3,383,968 | 5/1968 | Jägers | 83/595 |
| 3,913,431 | 10/1975 | Lambert | 83/477.2 |
| 3,919,908 | 11/1975 | Jaegers | 83/488 |
| 4,214,493 | 7/1980 | Elhaus | 83/488 |

Primary Examiner—Donald R. Schran
Attorney, Agent, or Firm—Kontler, Grimes & Battersby

[57] ABSTRACT

In a reciprocable circular saw, coplanar mounting of the machine carrier surfaces which constitute the table surface is achieved in that the legs of the frame have horizontal upper portions whose undersides constitute flat horizontal surfaces. The machine carriers are secured to the legs so that the surfaces which constitute a table surface abut against the first surfaces of the legs.

10 Claims, 4 Drawing Figures

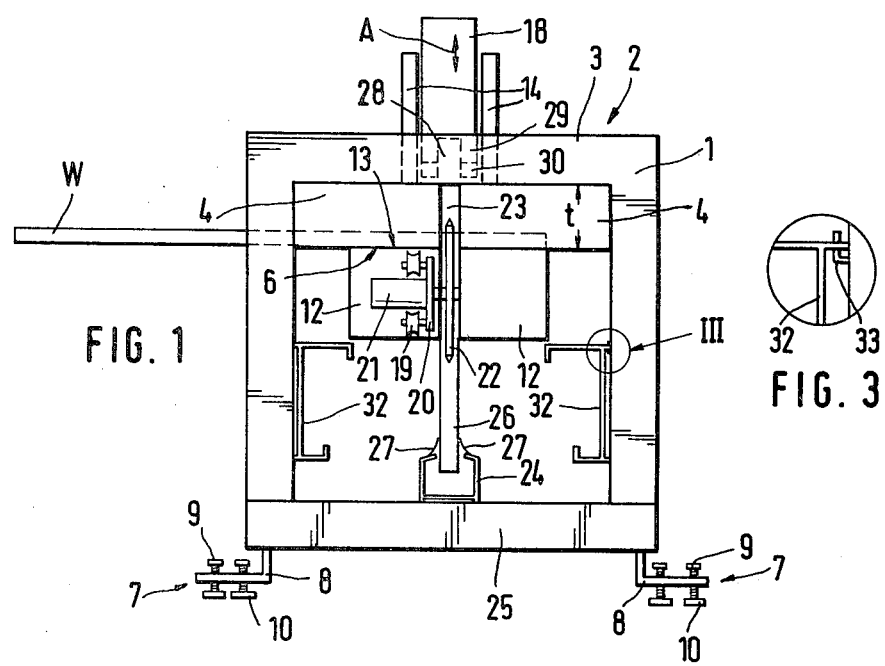
FIG. 1
FIG. 3
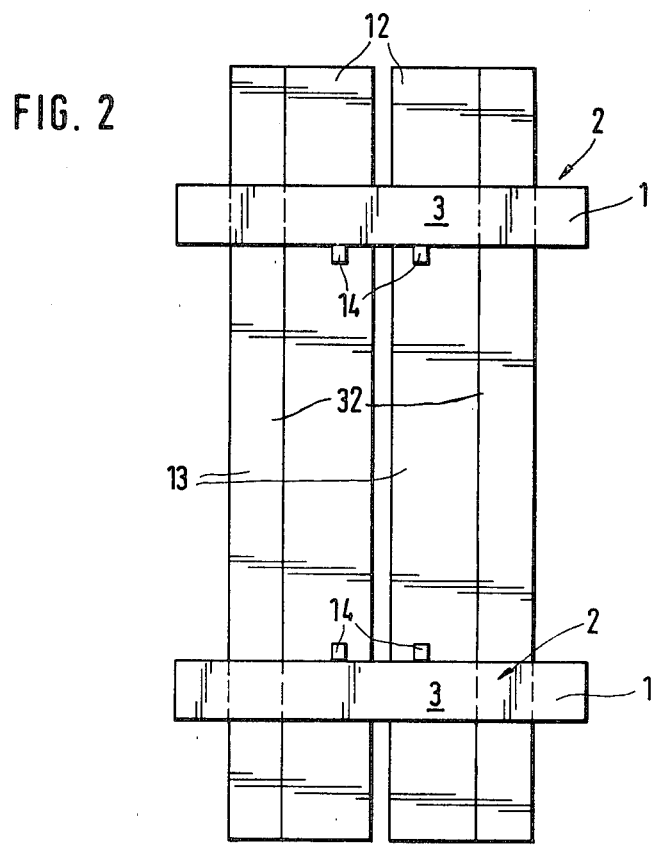
FIG. 2

FRAME FOR A RECIPROCABLE CIRCULAR SAW

CROSS-REFERENCE TO RELATED APPLICATION

This is a continuation-in-part of my copending application Ser. No. 62,406 filed July 31, 1979 for "Frame for a Reciprocable Circular Saw", now abandoned.

BACKGROUND OF THE INVENTION

The present invention relates to apparatus for positioning workpieces, and more particularly to improvements in apparatus for positioning workpieces in sawing machines or the like. Still more particularly, the invention relates to improvements in apparatus for holding workpieces which are to be severed, trimmed, partially cut and/or otherwise treated wherein a frame for a reciprocable circular saw consists of one or more legs and one or more machine carriers suspended directly from the legs. The saw unit is journalled in the machine carriers and the upper surfaces of the machine carriers simultaneously constitute a fitting surface for attachment of the machine carriers to the legs and a machine table for holding the workpieces.

It is already known to provide or associate a power saw with an apparatus which can support and hold workpieces in the course of the cutting operation. Certain presently known apparatus of such character employ reciprocable circular saws with a saw unit which is movable below the table for subdivision of large plates. The saw unit is journalled in one and/or two machine carriers and may be moved therethrough by means of a motor to cut workpieces which can be rested on the upper surfaces of the machine carriers which serve as the machine table. The workpieces can be clamped by a biasing beam to the upper surfaces of the machine carriers, i.e., to the machine table. Such prior art constructions have involved undesirable production costs, necessary to insure compliance with precise manufacturing tolerances required for accurate alignment of the various surfaces of the components which are joined together to position the machine carriers as the table for the workpieces.

OBJECTS AND SUMMARY OF THE INVENTION

An object of the invention is to provide a novel and improved apparatus for positioning plates, panels, sheets or other types of workpieces preparatory to precision-treatment of such workpieces, e.g., prior to subjecting the workpieces to the severing action of a rotary saw blade.

Another object of the invention is to provide an apparatus which is more reliable and accurate but much less expensive than apparatus of heretofore known design.

A still further object of the invention is to provide an apparatus wherein machine carriers are accurately aligned while the number of surfaces for which precise manufacturing tolerances are required is reduced.

The invention is embodied in an apparatus for supporting and positioning workpieces, especially for locating workpieces in machines employing reciprocable or otherwise movable circular saws. The apparatus comprises a frame with legs capable of supporting longitudinally extending elements of a reciprocable circular saw. The elements which may be supported on the legs include, for example, machine carriers, protecting members made of sheet metal, a longitudinal biasing beam and a channel for shavings. The legs are spaced apart from each other, each having a flat horizontal surface disposed in coplanar relationship. The machine carriers are secured to the legs and have upper finished surfaces, which upper surfaces together constitute the surface of the table and abut against the flat horizontal surfaces of the legs. Thus, the surface of the table simultaneously constitutes a fitting surface for attachment of the machine carriers to the supporting frame legs. In this manner, one can dispense with the machining of additional reference and fitting surfaces heretofore required by prior art designs which results in substantial savings in manufacturing costs.

The novel features which are considered as characteristic of the invention are set forth in particular in the appended claims. The improved apparatus itself, however, both as to its construction and its mode of operation, together with additional features and advantages thereof, will be best understood upon perusal of the following description of certain specific embodiments with reference to the accompanying drawing.

BRIEF DESCRIPTION OF THE DRAWING

FIG. 1 is an end elevational view of an apparatus which embodies one form of the invention;

FIG. 2 is a plan view of the apparatus shown in FIG. 1;

FIG. 3 is a removed, partial, enlarged view of a portion of the apparatus shown in FIG. 1 by the encircled area denoted with the arrow III.

DESCRIPTION OF THE PREFERRED EMBODIMENTS

Figure 4:
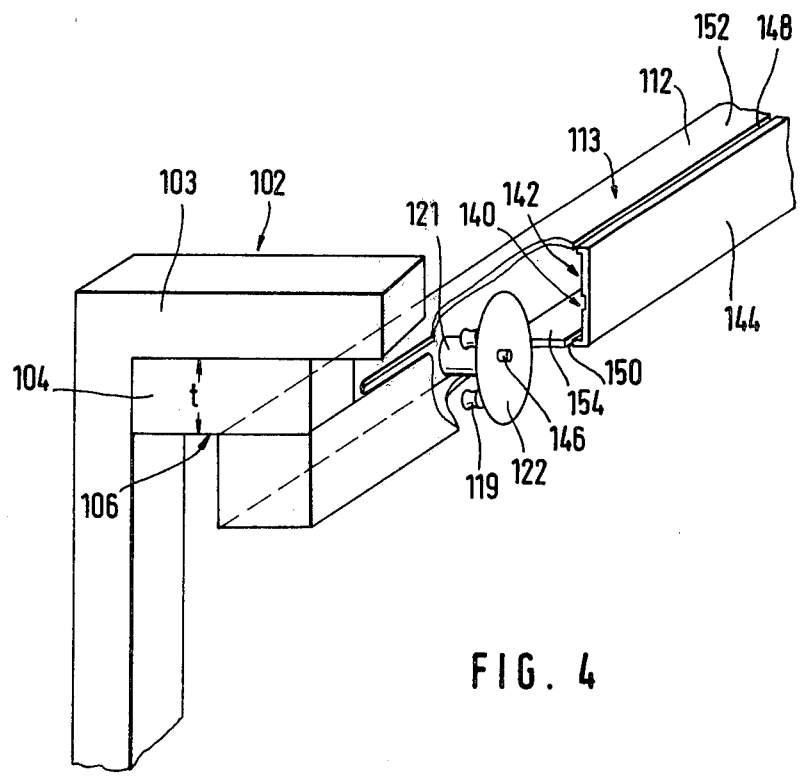
FIG. 4 is an oblique, partial, schematic view of an alternate embodiment of the apparatus of FIG. 1 with a section broken away.

The apparatus which is shown in the drawing comprises a frame or support for a reciprocable circular saw consisting of two spaced-apart supporting frame legs and one or more machine carriers suspended therefrom.

In the embodiment shown in FIGS. 1 to 3, the horizontal upper portion 2 of each leg 1 consists of a horizontal beam-like section 3 and spacing members 4 which are suspended from the section 3. The spacing members 4 are welded to the section 3 or otherwise securely fastened to the section 3 such that the each horizontal upper portion 2 comprises a unitary structure. Upon fastening of such spacing members 4 to the section 3 to form such unitary horizontal upper portion 2, the downwardly facing (as seen in FIG. 1) flat surfaces 6 of the horizontal upper portion 2 of each leg 1 are finished so that they are in coplanar relation. Leveling devices 7 are provided for each of the frame legs 1, which devices can be adjusted to secure desired inclination and elevation of the surfaces 6 of each leg 1. For example, the surfaces 6 of each leg 1 can be inclined horizontally and elevated to a preselected height wth relation to the underlying supporting surface or floor so that the surfaces 6 of both of the two spaced-apart supporting frame legs 1 will be coplanar. The leveling devices shown in FIG. 1 consist of L-shaped flanges 8 affixed to each leg 1, screws 9 which mesh with internal threads of holes in the flanges for axial movement of the screws relative to the flanges and washers 10 which are pivotally connected to the ends of the screws so that the screws can rotate independently of the washers.

Two parallel machine carriers 12 are suspendibly mounted from the frame legs 1. Coplanar prefinished surfaces 13 which form part of the carriers 12 and constitute the top surface of a table abut the downwardly facing flat finished surfaces 6 of the legs 1. During assembly, the prefinished surfaces 13 of the machine carriers 12 are screwed from below against the flat prefinished surfaces 6. In this manner, one achieves a full registry of the two surfaces 13 which together constitute a plane table surface. The additional finished surfaces which were heretofore required for accurate alignment of surfaces 13 on the supporting frame legs or on the machine carriers can be dispensed with. Also, the heretofore customary additional structural parts can be dispensed with.

Guides 14 are mounted on the supporting frame legs 1 for reception of a biasing beam 18, which is urged against the upper side of the workpiece W in the course of a severing operation as more fully explained below.

Guide means 19 are mounted within the machine carriers 12 for a carriage 20 such that the carriage is reciprocable longitudinally along the carriers. The guide means 19 may comprise rollers rotatably mounted on shafts journalled in the carriage 20 which are guided along roller guides 19A which extend along the longitudinal extent of carrier 12. In the embodiment of FIG. 1 there are four rollers, two of which are hidden from view by the two rollers shown. Carriage 20 supports a motor 21 serving to drive a circular saw blade 22 of the saw unit of the reciprocable circular saw. The blade 22 is thus rotatably mounted within the space between the carriers 12. The carriage 20 is analogous to those shown in U.S. Pat. No. 3,315,554 to Jaegers and in U.S. Pat. No. 3,919,908 to Jaegers.

A channel 23 is provided between the spacing members 4 into which the blade 22 can extend so that movement of the blade 22 can commence and terminate at points beneath the legs 1. In this manner, the blade can completely sever a large workpiece which extends the entire distance between the legs, i.e., which abuts each of the legs 1, without scoring or severing the horizontal section 3 of either leg. The thickness (t) of the spacing members can be varied, for one reason depending upon the size of blade to be used, i.e., the larger the blade diameter the larger the thickness. Furthermore, if the apparatus will only be used to sever smaller workpieces which do not abut either leg and limit stops can thus be employed to restrict travel of the blade so that it will not travel beneath the legs, the spacing members may be eliminated entirely and the undersurface of section 3 finished to comprise the prefinished surface 6.

A shavings channel 24 is mounted beneath the blade 22 on a lower horizontal portions 25 of legs 1 and extends longitudinally along the length of the path of travel of the blade. The carriage 20 further supports a tubular member 26 the lower end portion of which extends into the shavings channel 24. A longitudinally extending slot in the top portion of the channel 24 is normally sealed by two deformable elastic flaps or lips 27 which are spread apart by the lower end portion of the tubular member 26 in the region where this tubular member extends into the interior of the channel 24. Thus, as the carriage 20 travels lengthwise of the carriers 12, the lower end portion of the tubular member 26 spreads apart successive increments of the flaps or lips 27, and such lips close behind the advancing tubular member 26 to prevent escape of shavings from the channel 24. The upper open ended portion of the tubular member 26 is located near the blade 22 such that shavings resulting from operation of the blade are delivered by the tubular member to the shavings channel.

The biasing beam 18 is mounted for reciprocal movement in the manner shown by arrow A in FIG. 1. The beam is urged against the upper side of the workpiece W in the course of a severing operation so that the workpiece is held against movement between the upper surfaces 13 of the machine carriers 12 and the biasing beam 18 and withdrawn from contact with the workpiece to the position shown in FIG. 1 upon completion of the severing operation and during subsequent introduction of a new workpiece. The underside of the biasing beam 18 has a longitudinally extending groove 28 for receiving the topmost portion of the blade 22 so that the two marginal portions of the beam 29 can bear against the upper side of the workpiece W at the opposite sides of the path of the blade 22. The undersides of the two marginal portions 29 of the beam 18 carry strips 30 of rubber or other elastomeric material which prevents damage to the workpiece and further serves to prevent escape of dust between the workpiece and the beam 18 while nevertheless securely holding the workpiece W. The groove 28 temporarily intercepts and collects dust which is propelled upwardly while the blade 22 cuts into the material of the workpiece.

Protecting members 32 are separably secured to the frame members 1 by hooks 33 (FIG. 3) which are provided at the inner sides of the upright portions of the legs 1.

An alternate embodiment of the apparatus of FIGS. 1 to 3 is shown in FIG. 4. In the alternate embodiment, one carrier is employed rather than two. The construction of the legs 1 in the alternate embodiment as well as the construction of certain features of the carrier 12 and the reciprocable saw unit mounting are the same as that of similar elements of the first embodiment. Accordingly, corresponding members are used for such elements, incremented by 100 and such elements will not be further discussed here. A guide groove 140 is provided in an interior face 142 of one side wall 144 of the carrier 112. The groove 140 extends longitudinally along the length of travel of the blade 122. The shaft 146 of the blade is rotatably journalled in the groove 140. Slots 148 and 150 are provided in top and bottom walls 152 and 154, respectively, of the carrier 112. The blade 122 extends through the slots 148 and 150. Limit stops (not shown) are provided to restrict movement of guide means 119 and thus of the blade 122 such that the blade does not pass beneath the legs 1. Thus, slot 148 (and slot 150 although not shown) stop short of member 104.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalents of the claims.

I claim:

1. In a reciprocable circular saw for treating at least one workpiece, a frame comprising a plurality of spaced-apart legs including upper portions having flat coplanar surfaces on the undersides thereof and vertically extending side portions connected to and supporting said upper portions, elongated carrier means extending longitudinally between and secured to said legs, said carrier means having at least one upper finished surface which abuts against said flat coplanar surfaces and constitutes the surface of a table for positioning said workpiece, and a saw, a portion of which is mounted in said carrier means for longitudinal movement along said carrier means to treat said workpiece.

2. A frame according to claim 1, wherein said carrier means comprises two elongated carriers mounted in spaced-apart relation, each carrier having one of said finished surfaces which abuts against said flat coplanar surfaces, said blade being mounted within the space between said carriers.

3. A frame according to claim 1, wherein said carrier means comprises one elongated carrier and said saw blade is rotably mounted in said carrier, said carrier having at least one slot through which said blade extends.

4. A frame according to claim 1, wherein each of said legs constitutes a frame member and said flat coplanar surfaces are disposed at the undersides of said portions of the respective frame members.

5. A frame according to claim 1, wherein each of said legs further comprises means for adjusting the inclination and elevation of said portions to insure that said flat surfaces of said portions are coplanar.

6. A frame according to claim 1, wherein each of said legs further comprises upright portions and further comprising protecting members and means for securing said protecting members to said upright portions.

7. A frame according to claim 1, wherein said portions of said legs are transverse beams and further comprising a biasing device and guide members for the reception of said biasing device, said guide members being provided on said beams at a level above said flat surfaces.

8. A frame according to claim 1, further comprising a suction channel for shavings, said channel being mounted on said legs.

9. In an apparatus for supporting and positioning workpieces for treatment with a reciprocable circular saw, a frame comprising a plurality of spaced-apart legs including horizontally extending upper portions having undersides constituting flat surfaces, vertically extending side portions connected to and supporting said upper portions, lower portions and means for adjusting the inclination and elevation of said flat surfaces; elongated carrier means for supporting the saw, said carrier means extending longitudinally between and being secured to said legs and havng finished surfaces which constitute the surface of a table for supporting and positioning of workpieces and abut against said flat surfaces; biasing means secured to said upper portions by guides for holding workpieces relative to said table during treatment; protecting means secured to said upright portions for shielding the saw; and means for collecting shavings during treatment of workpieces, said collecting means being secured to said lower portions.

10. A frame according to claim 9, wherein said means for collecting shavings comprises a tubular member which extends downwardly into a collection channel, wherein the interface between said tubular member and said collection channel is sealed by at least one deformable elastic flap provided on said channel.

* * * * *